United States Patent
Ambs

(10) Patent No.: US 7,320,561 B2
(45) Date of Patent: Jan. 22, 2008

(54) SYSTEM AND METHOD FOR HANDLING BULK MATERIALS

(75) Inventor: Richard W. Ambs, Williamsport, PA (US)

(73) Assignee: The Young Industries, Inc., Muncy, PA (US)

(*) Notice: Subject to any disclaimer, the term of this patent is extended or adjusted under 35 U.S.C. 154(b) by 0 days.

(21) Appl. No.: 11/508,850

(22) Filed: Aug. 24, 2006

(65) Prior Publication Data
US 2007/0154271 A1 Jul. 5, 2007

Related U.S. Application Data

(62) Division of application No. 11/320,572, filed on Dec. 30, 2005, now Pat. No. 7,137,759.

(51) Int. Cl.
*B65G 51/36* (2006.01)

(52) U.S. Cl. .............. 406/31; 406/55; 406/89

(58) Field of Classification Search ............... 406/55, 406/89, 128, 28, 31, 175
See application file for complete search history.

(56) References Cited

U.S. PATENT DOCUMENTS

| | | | | |
|---|---|---|---|---|
| 3,747,766 A | * | 7/1973 | Brooks | 210/259 |
| 3,970,159 A | * | 7/1976 | Hahn | 177/123 |
| 4,172,924 A | * | 10/1979 | Warszawski | 429/15 |
| 4,185,669 A | * | 1/1980 | Jevakohoff | 141/59 |
| 4,286,970 A | * | 9/1981 | Cankurt et al. | 48/87 |
| 4,453,959 A | * | 6/1984 | Bishkin | 62/542 |
| 4,579,595 A | * | 4/1986 | Sachetto et al. | 127/37 |
| 4,620,862 A | * | 11/1986 | Dorn et al. | 65/399 |
| 5,010,831 A | * | 4/1991 | Halfhide | 110/347 |
| 5,041,301 A | * | 8/1991 | Gillette et al. | 427/459 |
| 5,341,730 A | * | 8/1994 | Tydiks | 100/37 |
| 5,665,232 A | * | 9/1997 | Schlegel | 210/408 |
| 5,988,234 A | * | 11/1999 | Wegman | 141/67 |
| 6,000,995 A | * | 12/1999 | Ruholl | 451/2 |
| 6,021,821 A | * | 2/2000 | Wegman | 141/93 |
| 6,102,088 A | * | 8/2000 | Wegman | 141/286 |
| 6,340,036 B1 | * | 1/2002 | Toyoizumi et al. | 141/275 |
| 6,454,454 B1 | * | 9/2002 | Barr | 366/78 |
| 6,497,259 B1 | * | 12/2002 | Wegman | 141/267 |
| 6,722,406 B2 | * | 4/2004 | Wegman et al. | 141/311 A |
| 7,004,210 B1 | * | 2/2006 | Wegman et al. | 141/256 |
| 7,144,204 B2 | * | 12/2006 | Hilgraf | 406/95 |
| 7,156,372 B2 | * | 1/2007 | Kelsey et al. | 251/359 |

* cited by examiner

*Primary Examiner*—Joe Dillon, Jr.
(74) *Attorney, Agent, or Firm*—Stevens, Davis, Miller & Mosher, LLP

(57) ABSTRACT

A bulk material handling system generally consisting of means for holding the material; means for conveying the material including a first conduit formed of a permeable material having an inlet communicating with an outlet of the material holding means and an outlet, a second conduit formed of an impermeable material encompassing and spaced from the first conduit, providing a chamber therebetween, and an auger disposed in the first conduit for transporting material received through the inlet to the outlet thereof; means for rotatably driving the auger; and means for supplying a fluidizing gas under pressure to the chamber between the first and second conduits.

2 Claims, 5 Drawing Sheets

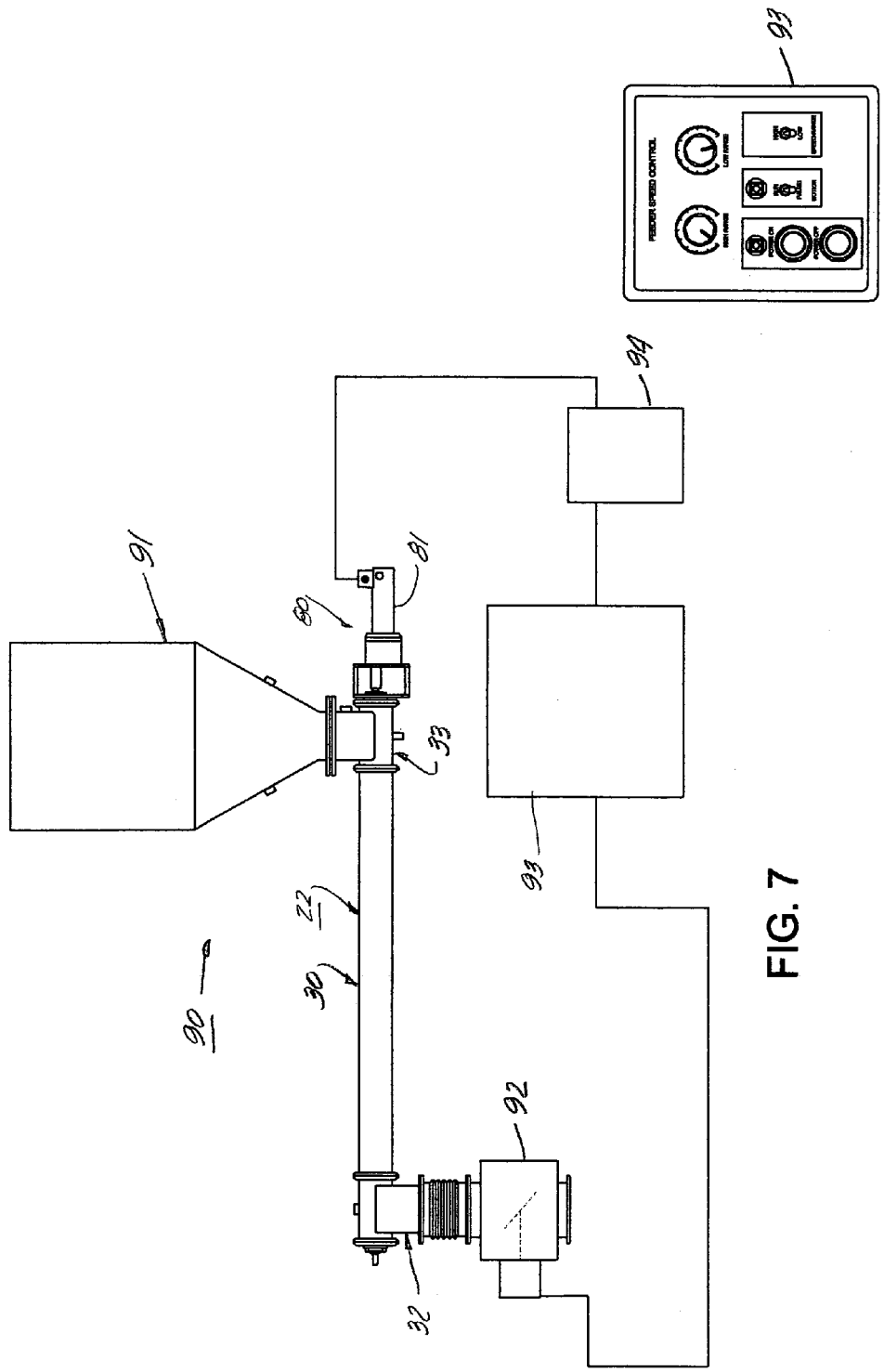

SYSTEM AND METHOD FOR HANDLING BULK MATERIALS

This application is a divisional application of U.S. patent application Ser. No. 11/320,572 filed on Dec. 30, 2005 now U.S. Pat. No. 7,137,759.

This invention relates to an improved system and method for handling bulk materials, and more particularly to an improved system and method for conveying metered amounts of such materials having poor flowability. The invention further contemplates a novel apparatus for conveying such materials.

BACKGROUND OF THE INVENTION

In a number of industries involved in the handling of bulk materials having poor flow characteristics, it commonly has been the practice to convey such materials by means of mechanical conveyors. Typically, such conveyors have consisted of screw conveyors, generally comprising an elongated, rotatable auger housed in an elongated tube. In the use of such conveyors, however, it has been found that the flow rates of sluggish and cohesive bulk materials is poor, the flow rates of such materials are difficult to control, a substantial amount of torque is required to operate such conveyors and such materials tend to build up in the tube around the auger which often is difficult, time consuming and cumbersome to clean. In addition, because of a lack of control of the flow rates in such conveyors, it is difficult to accurately meter such materials as often is required in various processes. Accordingly, it is the principal object of the present invention to provide an improved system and method for conveying bulk materials having poor flow characteristic with the use of a screw type conveyor in which the flow rate of sluggish and cohesive bulk materials is improved, the torque required to drive the augers of such conveyors is reduced and a buildup in the conduit surrounding the auger of such conveyors is reduced if not entirely eliminated.

SUMMARY OF THE INVENTION

The principal object of the present invention is achieved by providing a bulk material handling system generally consisting of means for holding a supply of such material; means for conveying the material including a first conduit formed of a permeable material having an inlet communicating with an outlet of a material holding means and an outlet, a second conduit formed of a impermeable material encompassing and spaced from the permeable conduit, providing a chamber therebetween, and an auger disposed in the permeable conduit for transporting material received through the inlet to the outlet thereof; means for rotatably driving the auger; and means for supplying a fluidizing gas under pressure to the chamber whereby such fluidizing gas penetrates the inner permeable conduit encasing the auger, which forms a boundary layer consisting of a mixture of fluidizing gas and particles of the bulk material being conveyed, thus reducing surface friction and correspondingly enhancing the flow of material propelled by the auger. In such an arrangement, the flow rate may be more readily controlled by simply controlling the speed of the drive motor for the auger. More accurate amounts of material may be metered simply by monitoring the feed rate of material being discharged from the screw conveyor, comparing such feed rate with a selected feed rate and correspondingly adjusting such feed rate by controlling the speed of the drive motor for the screw conveyor; monitoring the loss of weight of material fed into the screw conveyor; comparing such loss of weight with a selected weight and adjusting the speed and/or discontinuing the operation of the drive motor; and monitoring a gain of weight of material discharged from such screw conveyor, comparing such weight to a predetermined weight and correspondingly adjusting the speed and/or discontinuing the operation of the drive motor. The supply of fluidizing air to the inner conduit of the screw conveyor surrounding the auger functions not only to improve the flow rate of sluggish and cohesive materials through the screw conveyor but reduces the amount of torque required to drive the auger of the conveyor, permits more precise control of the flow rate and prevents the buildup of material in the conveyor requiring periodic cleaning.

BRIEF DESCRIPTION OF THE DRAWINGS

FIG. 7 is a diagrammatic-schematic view of another embodiment of the invention;

FIG. 8 is a front view of a control panel used with the embodiment shown in FIG. 7;

DETAILED DESCRIPTIONS OF PREFERRED EMBODIMENTS OF THE INVENTION

Figure 1:
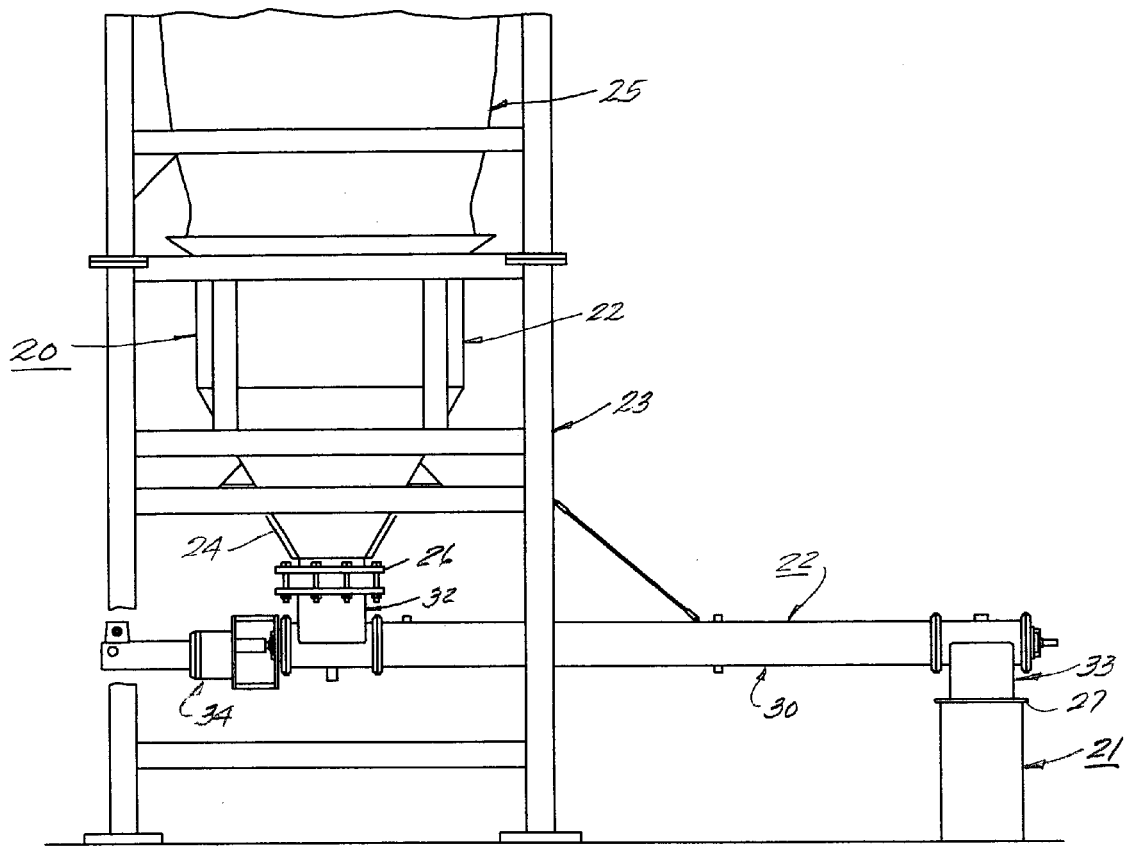
FIG. 1 is a side elevational view of a first embodiment of the present invention.

Referring to FIGS. 1 through 6 of the drawings, there is illustrated a system for conveying a bulk material generally consisting of a hopper 20 for holding a supply of bulk material to be conveyed, a receptacle 21 to which material from the hopper is to be conveyed and a screw conveyor 22 operatively interconnecting the hopper and the receptacle for conveying material from the hopper to the receptacle. Hopper 20 includes an upper, cylindrical section 22 supported on a frame structure 23 and a lower, inverted frusto-concially configured section 24. The upper end of hopper section 22 is open to receive the lower end of a bag 25 having a set of straps at an upper end thereof for suspending the bag from the upper end of the frame structure, and a lower outlet spout through which bulk material contained in the bag may flow into the hopper. The lower end of hopper section 24 is provided with a mating flange 26 for connecting the outlet of the hopper to an inlet of the screw conveyor. Typically, the hopper functions to permit the gravity flow of material received from the bulk bag through the hopper and the outlet thereof. Preferably, the lower section of the hopper is provided with a boundary layer of fluidize gas, usually air, to enhance the gravity flow of material through the lower hopper section. Receptacle 21 may consist of any form of receptacle for receiving material from screw conveyor 22. It may consist of a conduit for guiding material to a processing piece of equipment, a storage container, a transportable container or any other type of apparatus. The upper end thereof is provided with a mating flange 27 for connecting the discharge end of the screw conveyor to receptacle 21.

Screw conveyor 22 generally includes a transport line 30 housing an auger 31, a transition section 32 interconnecting and intercommunicating the lower hopper section and an inlet end of transport line 30, a transition section 33 interconnecting and intercommunicating an outlet end of transport line 30 and receptacle 21 and a motor unit 34 mounted on section 32 and operatively connected to auger 31.

Transport line 30 consists of an inner, tubular conduit 40 defining a material passageway 41 in which auger 31 is axially disposed, a pair of annular mating flanges 42 and 43 and an outer, tubular conduit 44 spaced from conduit 40 and disposed between annular flanges 42 and 43 to provide an annular chamber 45 provided with a pair of inlets 46 and 47. Inner conduit 40 is formed of a gas permeable material and outer conduit 44 is formed of a gas impermeable material so that when inlets 46 and 47 are connected to a source of gas under pressure, a supply of fluidizing gas will be introduced into chamber 45 and permeate through inner conduit 40 to form a boundary layer within passageway 41 consisting of a mixture of fluidizing gas and particles of bulk material transported through passageway 41. Although a single, linear transition line section is illustrated, it is to be understood that a plurality of such sections may be utilized to provide transport lines of various lengths.

Transition sections 32 and 33 are substantially similar in construction and function. Transition section 32 is adapted to be connected to an upstream end of transport line section 30 and includes a first segment 50 and a second segment 51. Segment 50 includes an inner, tubular conduit 52 having the same diameter as conduit 40 and disposed in axial alignment therewith to define a passageway 53 communicating with passageway 41, a mating flange 54 mating with and connected preferably with a set of bolts to annular flange 42, and an annular flange 55, and an outer, tubular conduit 56 spaced from inner conduit 52, between annular flanges 54 and 55 and in alignment with outer conduit 44 to form an annular chamber 57. Segment 51 consists of an inner, tubular section 58 and an outer, tubular section 59. Inner, tubular conduit 58 is axially disposed radially relative to the axis of conduit 52, is connected at a lower end thereof to conduit 52 providing a material flow passageway 60 communicating with material flow passageway 53 and is provided with an annular flange 61 at an upper end thereof which is mated and connected to annular flange 26 of lower hopper section 24 preferably by a set of bolts. Outer, tubular conduit 59 is spaced from inner conduit 58 and disposed between outer conduit 56 and annular mating flange 61 to form an annular chamber between the inner and outer conduits 58 and 59 communicating with annular chamber 57. Inner conduits 52 and 58 also are formed of a gas permeable material and outer conduits 56 and 59 are formed of a gas impermeable material. Chamber 57 also is provided with an inlet connected to a source of fluid under pressure so that a fluidizing gas may be supplied to chamber 57 and the chamber formed between conduits 58 and 59 to permeate conduits 52 and 59 and thus provide boundary layers consisting of a mixture of fluidizing gas and particles of the bulk material being conveyed. The lower end of section 32 further is provided with an inlet conduit 62 which may be connected to a source of gas under pressure to permit bursts of gas to be injected axially into section 32, axially relative to segment 51, to dislodge any bulk material introduced through segment 51 and settled in passageway 53 within conduit 52.

Figure 4:
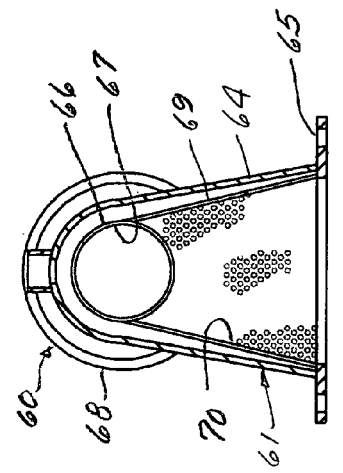
FIG. 4 is a cross sectional view taken along line 4-4 in FIG. 3.

As previously indicated, transition section 33 is similar to transition section 32 in construction and function. It includes an upper segment 60 comparable to segment 50 and a segment 61 comparable to but constructed slightly differently than section 51. Segment 60 is provided with an annular flange 62 which is mated and connected to annular flange 43 to connect transition section 33 to transport line 30 and an annular flange 63 at the opposite end thereof. As best shown in FIG. 4, the outer, impermeable conduit 64 flares downwardly and outwardly and is provided with a peripheral flange 65 which is connected to peripheral flange 27 of receptacle 21. As also shown in FIG. 4, segment 60 includes an inner, permeable conduit 66 providing a material flow passageway 67 communicating with material flow passageway 41 and spaced from the outer, impermeable conduit 68 and a permeable, inner conduit 69 providing a material flow passageway 70 intercommunicating passageway 67 and the opening in flange 65 and spaced from outer impermeable conduit 64 to provide a chamber therebetween. As in the previously described section, fluidizing air under pressure is supplied to the chamber between the inner and outer conduits of section 60 which permeates through the inner conduits thereof to enhance the flow of material therethrough.

Figure 3:
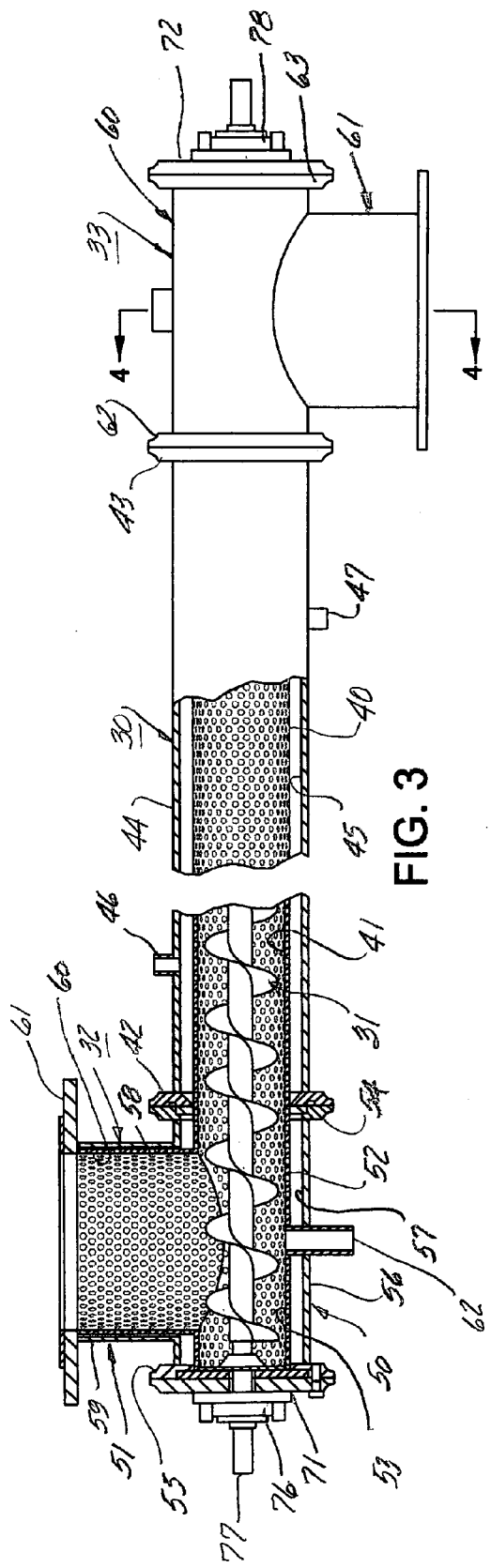
FIG. 3 is an enlarged view of the screw conveyor shown in FIG. 1, having a portion thereof broken away.
Figure 6:
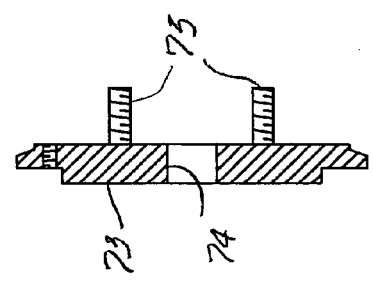
FIG. 6 is a sectional view taken along line 6-6 in FIG. 5.
Figure 5:
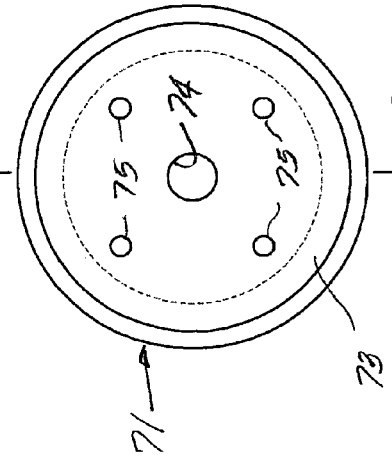
FIG. 5 is an enlarged front view of a mating flange utilized in the screw conveyor shown in FIG. 3.

Mounted on and connected to annular flange 55 is an annular end plate 71. Similarly mounted and connected to annular flange 63 is an annular end plate 72 which is similar in construction to end plate 71. Referring to FIGS. 5 and 6, end plate 71 will be seen to include an annular, main body portion 73 providing an axial opening 74 and a set of circumferentially spaced threaded studs 75. As shown in FIG. 3, a bearing 76 is mounted on end plate 74 by means of threaded studs 75 and an end portion of shaft 77 extends through opening 74 of end plate 71 and is journaled in bearing 76. The opposite end of shaft 77 similarly extends through an axial opening in end plate 72 and is journaled in a bearing 78 mounted on end plate 72.

Figure 2:
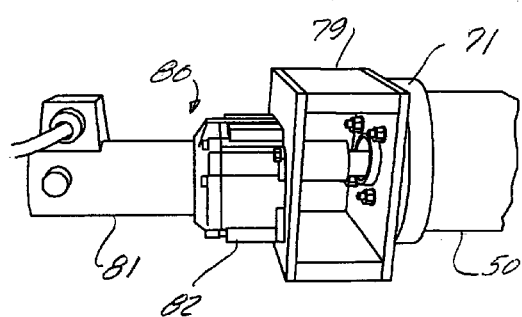
FIG. 2 is an enlarged, perspective view of the drive motor of the screw conveyor shown in FIG. 1, having portions thereof broken away.

Referring to FIG. 2, there also is mounted on the end of end plate 71, a support bracket 79. Mounted on the support bracket is a drive unit 80 including a variable speed, DC motor 81 provided with a gear reduction unit 82 operatively connected to the end of auger shaft 72 extending through the mounting bracket.

In the operation of the assembly shown in FIGS. 1 through 6, bag 25 filled with bulk material to be conveyed to receptacle 21 is positioned in a suspended manner on support frame 33 so that the lower end thereof is received in the upper end of hopper 20. Certain controls are then operated to supply fluidizing air to the chambers of conveyor 30 between the inner and outer conduits thereof which correspondingly is caused to permeate the inner, permeable conduits thereof. Motor 81 is then energized to rotate auger 31. The spout portion of the bag is then unfolded and freed to permit bulk material in the bag to be gravity fed through transition section 32 into the transport line section 30. Material gravity fed into the transport line section is caused to be transported along the length thereof and discharged through transition section 33 into receptacle 21 by the action of auger 31. Air permeating through the inner, permeable conduits of conveyor 22 functions to provide a boundary layer within the permeable conduits consisting of a mixture of fluidizing air and particles of the material being conveyed. Such boundary layer not only reduces friction in the flow of material through the conveyor, thus reducing the amount of torque required to drive the auger, but prevents the build up of material in the conveyor. The flow rate of material transported by the conveyor may be adjusted merely by varying the speed of motor 81. In the event material fed from the hopper into the conveyor may settle in transition section 32 tending to clog or impair the flow of material in the conveyor, a burst of air may be injected through inlet 62 to dislodge any such buildup of material. In addition, in lieu of simply an opening between lower hopper section 24 and transition section 32, an air lock or rotary valve may be provided therebetween. In the further event that it is desired to clean the interior of the conveyor, drive unit 80, support bracket 79 and end plate 71 may be removed from one end of the conveyor and end plate 72 may be removed from the other end of the conveyor to permit removal of the auger and provide access to the interior of the conveyor. In addition, if required, transition sections 32 and 33 may be detached from transport line section 33 for cleaning, maintenance or repair purposes.

FIGS. 7 through 10 illustrate several systems embodying the present invention and incorporating the conveyor as shown in FIGS. 2 through 6, which are operable to convey controlled amounts of bulk materials often required in various processes and for other purposes. Referring to FIGS. 7 and 8, there is illustrated a system 90 including a vessel 91 containing a bulk material to be conveyed in metered amounts, a screw conveyor 22 as previously described, a bulk solids mass flowmeter 92, a controller 93 and a motor control 94. Transition section 33 of the screw conveyor is connected to the lower discharge end of vessel 91 so that material within the vessel will be gravity fed into the screw conveyor. The screw conveyor transports the material to transition section 32 which functions to discharge the material through flowmeter 92 into the desired receptacle. Controller 93 receives an analog or digital mass flow rate output signal from flow meter 92 compares the sensed mass flow rate to a setpoint mass flow rate, and sends a signal to motor control unit 94 to incrementally either increase or decrease the motor speed to bring the feeder output rate to match the setpoint feed rate. This arrangement may be provided with an impact mass flowmeter to determine instantaneous mass flow and provide a feedback signal to the controller to close the control loop for motor speed adjustment to meet the desired flow rate. Such system would use a continuously variable speed drive motor. The total weight of material discharged could be estimated by numerical integration of the output signal of the mass flowmeter with respect to time.

Figure 9:
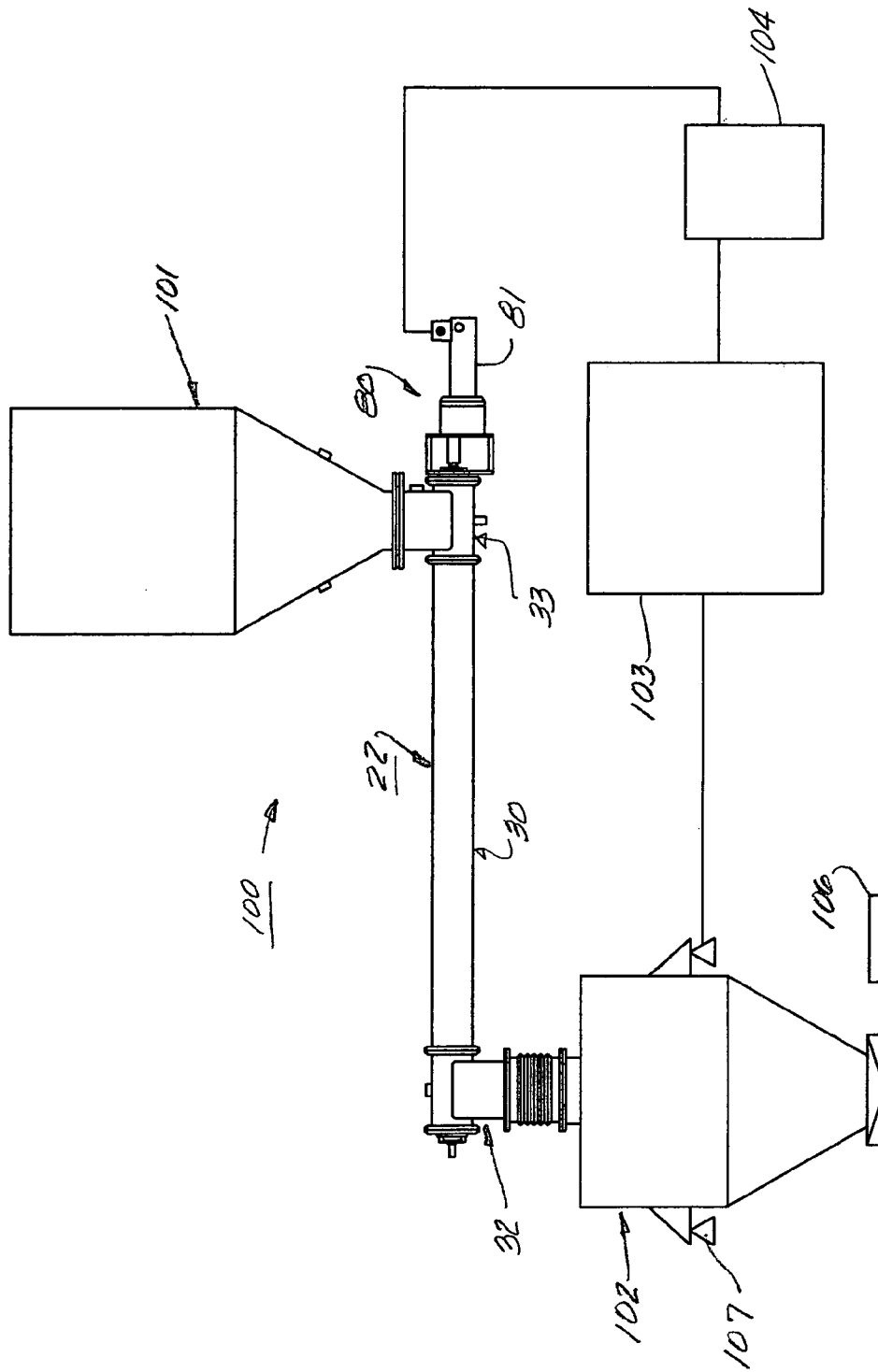
FIG. 9 is a diagrammatic-schematic view of a third embodiment of the invention.

FIG. 9 illustrates a system 100 which includes a vessel 101 containing a bulk material to be fed in a metered amount to a receptacle, a screw conveyor 22, a receiving hopper 102, a controller 103 and a motor control 104. Receiving hopper 102 is provided with a slide valve 105 at the discharge end thereof operated by a solenoid actuator 106, and further is provided with a set of load cells 107 for sensing the weight of material deposited in the receiving hopper. In the operation of the system, material is gravity from vessel 101 into the screw conveyor 22 which transports the material to the receiving hopper 102. The load cells sense the weight of material fed to the receiving hopper and emit a signal to the controller which compares the weight of material added to the receiving hopper with a setpoint weight within a preset tolerance limit and sends a control signal to motor control 104 to reduce the speed thereof thus reducing the discharge rate of the screw conveyor and correspondingly reducing the likelihood of overshooting the setpoint weight. Upon reaching a second preset weight tolerance limit relative to the setpoint weight, the controller signals the motor control to stop the motor. The second preset tolerance usually is made sufficient to account for material in transit between the screw conveyor and the receiving hopper, as well as material which is discharged from the screw conveyor as it continues to operate to a stop.

The gain-in-weight system shown in FIG. 9 measures the net weight of the receiving hopper to determine how much the feeder has discharged. Such system would most generally be used for batch weighing and not continuous metering. The drive motor would be set up with a more or less fixed high delivery speed rate and a more or less fixed low delivery speed rate to slowly approach the setpoint weight of material deposited in the hopper.

Figure 10:
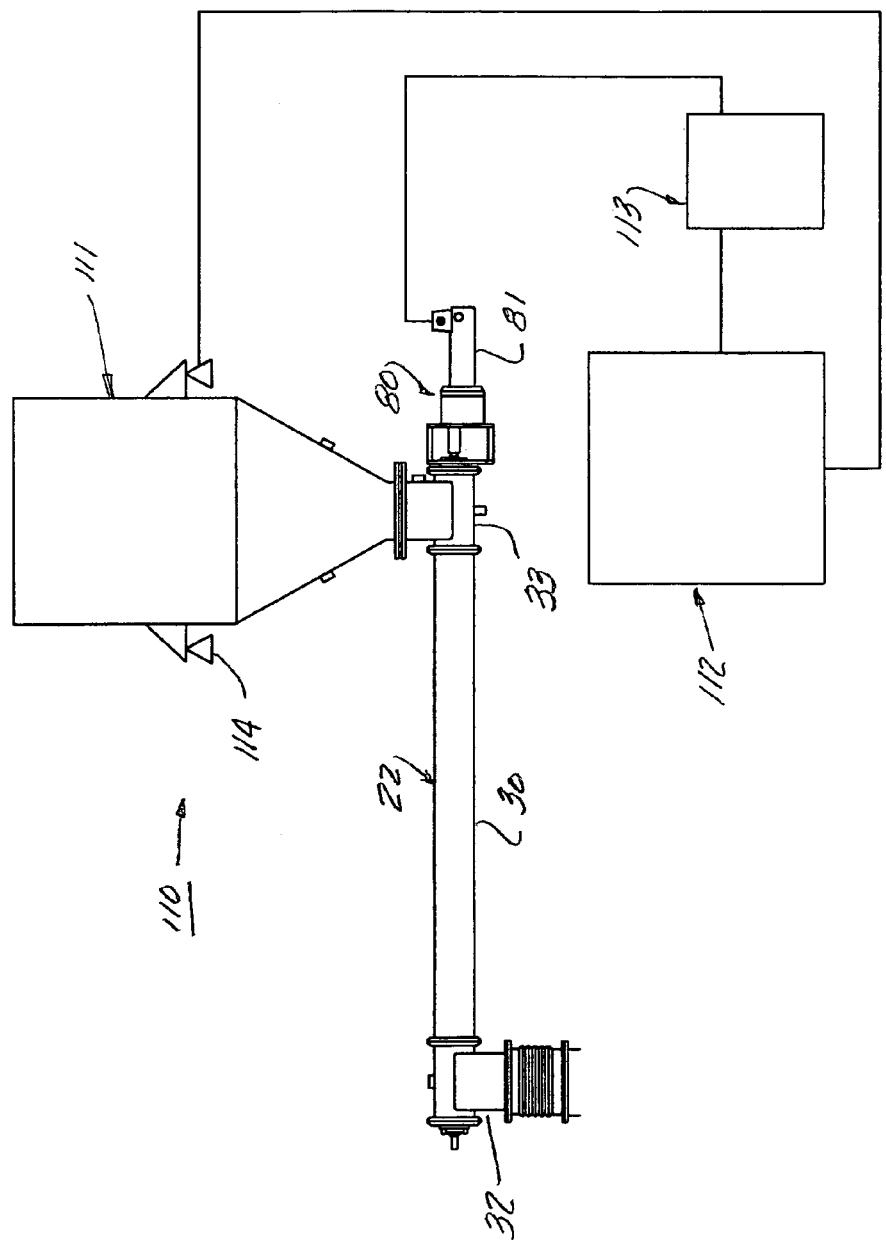
FIG. 10 is a diagrammatic-schematic view of a fourth embodiment of the invention.

System 110 shown in FIG. 10 is comparable to the system shown in FIG. 9 and includes a hopper 111 holding a bulk material to be dispensed in metered amounts, a screw conveyor 22 which is gravity fed material from hopper 111, a controller 112 and a motor control 113. The dispensing hopper is provided with a set of load cells 114 which function to sense a weight loss of material in hopper 111 and conveyor 22, and transmit such data to controller 112. In operation, the signal produced by the load cells is compared to a setpoint weight inputted into the controller, within a preset tolerance limit, and the controller sends a signal to the motor controller to reduce the speed of the screw conveyor, making provision for overshooting the setpoint weight. Upon reaching a second preset weight tolerance limit from the set point weight, the controller signals the motor control to discontinue the operation of the motor. The second preset tolerance is made sufficient to account for material which is discharged from the screw conveyor as it slows down to a complete stop. This system also may be employed for continuous metering applications by calculating the weight of the material being discharged from the screw conveyor on a per unit of time basis and adjusting the speed of the drive motor upwardly or downwardly until the calculated discharge rate is within an acceptable tolerance from the desired discharge rate.

In this system, the combined weight of feed hopper 111 and screw feeder 22 and their contents is suspended on load cells 114. Thus during normal feeding any change in system weight measured via the load cells amounts to the weight of material which has been discharged from the outlet of the screw conveyor. This system can be operated in a batch mode similar to the gain-in-weight system described previously and using a fixed high speed and fixed low speed drive arrangement to rapidly approach target weight then to slowly advance to within a close tolerance of target weight with allowance of settling of in-flight material.

This system can also act as a continuous metering type system by differentiating the change in net weight with respect to time and varying screw conveyor speed to obtain the desired rate of discharge. When operating in this manner, it is necessary to suspend rate calculation and hold a fixed screw conveyor speed whenever the feed hopper empties to the point at which it must be refilled to ensure continuous product delivery.

In the use of any of the described systems, it will be appreciated that controllable amounts of bulk material may be conveyed from a first site to a second site for processing or other purposes. In the arrangement utilizing a flow meter to measure the mass flow rate from the screw conveyor, it is possible to operate such system in a batch mode by numerically integrating the mass flow rate signal from the solid mass flowmeter although the accuracy may not be as good as the weight gain or weight loss systems.

Although a single auger profile is illustrated, it further is to be understood that augers of different flights may be utilized within the scope of the invention including helicoids, ribbon, cut, cut and folded, fixed or adjustable mixing paddles, non-metallic, hollow, brush and other flights. It further will be appreciated that the screw conveyor may be of a modular construction comprised of a number of components that may be configured as desired, and readily disassembled for cleaning, maintaining or repairing and quickly reassembled and placed in service. The provision for supplying fluidizing air to the material flow passageways of the conveyor not only enhances the flow rate of the material being conveyed and reduces if not eliminates the deposit of material but provides for a more precise metering of the material being conveyed and substantially reduces the torque required to drive the conveyor.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. A method of transporting metered amounts of a particulate, bulk material, comprising:

conveying said material received at an upstream site to a downstream site by means of an auger disposed in a conduit having a body formed of a permeable material, said conduit having a material inlet at said upstream site, said conveying material entering said conduit through said inlet, said auger, driven by a motor;

supplying a gas under pressure through said body to form a boundary layer of fluidizing gas along an inner surface of said conduit;

sensing the mass flow rate of said material received at said downstream site; and varying the operation of said motor responsive to differences between said sensed flow rate and a selected flow rate to incrementally increase or decrease the speed thereof to achieve said selected flow rate.

2. A method according to claim 1 including gravity feeding said material into said conduit.

* * * * *